(12) United States Patent
Larsen et al.

(10) Patent No.: US 7,070,196 B1
(45) Date of Patent: Jul. 4, 2006

(54) KAYAK CARRIER

(75) Inventors: Sammy L. Larsen, Kingsley, MI (US); Vicki D. Galloup, Traverse City, MI (US)

(73) Assignee: OnEdge Kayak Systems, LLC, Traverse City, MI (US)

( * ) Notice: Subject to any disclaimer, the term of this patent is extended or adjusted under 35 U.S.C. 154(b) by 0 days.

(21) Appl. No.: 11/022,458

(22) Filed: Dec. 22, 2004

(51) Int. Cl.
*B60P 3/10* (2006.01)

(52) U.S. Cl. ............... 280/414.1; 280/414.2; 280/414.3; 211/85.7; 211/70.5

(58) Field of Classification Search ............ 280/414.1, 280/414.2; 211/85.7, 70.5
See application file for complete search history.

(56) References Cited

U.S. PATENT DOCUMENTS

| | | | | |
|---|---|---|---|---|
| 3,026,981 A | * | 3/1962 | Youtie | 193/35 R |
| 3,578,190 A | | 5/1971 | May | |
| 3,610,431 A | | 10/1971 | Rodden | |
| 3,870,339 A | | 3/1975 | Goff | |
| 4,103,925 A | * | 8/1978 | Palamara | 280/414.1 |
| 4,103,926 A | | 8/1978 | Johnston et al. | |
| 4,271,997 A | * | 6/1981 | Michael | 224/546 |
| 4,273,351 A | * | 6/1981 | Salamander | 280/414.1 |
| 4,531,774 A | * | 7/1985 | Whatley | 296/37.6 |
| 4,932,830 A | | 6/1990 | Woodburn | |
| 5,195,767 A | | 3/1993 | Des Roches | |
| 5,957,350 A | * | 9/1999 | Giles | 224/310 |
| 6,217,053 B1 | | 4/2001 | Forsythe et al. | |
| 6,390,309 B1 | * | 5/2002 | Tucker | 211/85.7 |
| 6,561,396 B1 | * | 5/2003 | Ketterhagen | 224/310 |
| 6,926,292 B1 | * | 8/2005 | Weeks | 280/47.331 |

OTHER PUBLICATIONS

Thule Car Rack systems, 835XT Hull-A-Port(TM), owner/technical manual, 2004, 6 pages, Thule Car Rack Systems, U.S.
Pihlaja, Thule Hull-A-Port, consumer review, Oct. 25, 2001, 2 pages, MtbREVIEW.com, U.S.

* cited by examiner

*Primary Examiner*—Lesley D. Morris
*Assistant Examiner*—Marlon Arce-Diaz
(74) *Attorney, Agent, or Firm*—Northern Michigan Patent Law, PLC

(57) ABSTRACT

A kayak carrier with a pair of spaced horizontal supports having open-topped hull supports defining essentially continuous curved surfaces that permit the edge of a kayak to be inserted easily and to naturally rotate into a locking position. In the preferred form the kayak carrier has two spaced horizontal rack members with aligned hull supports, the rack members being adapted to be removably mounted in the side-rail sockets of a standard utility trailer.

13 Claims, 6 Drawing Sheets

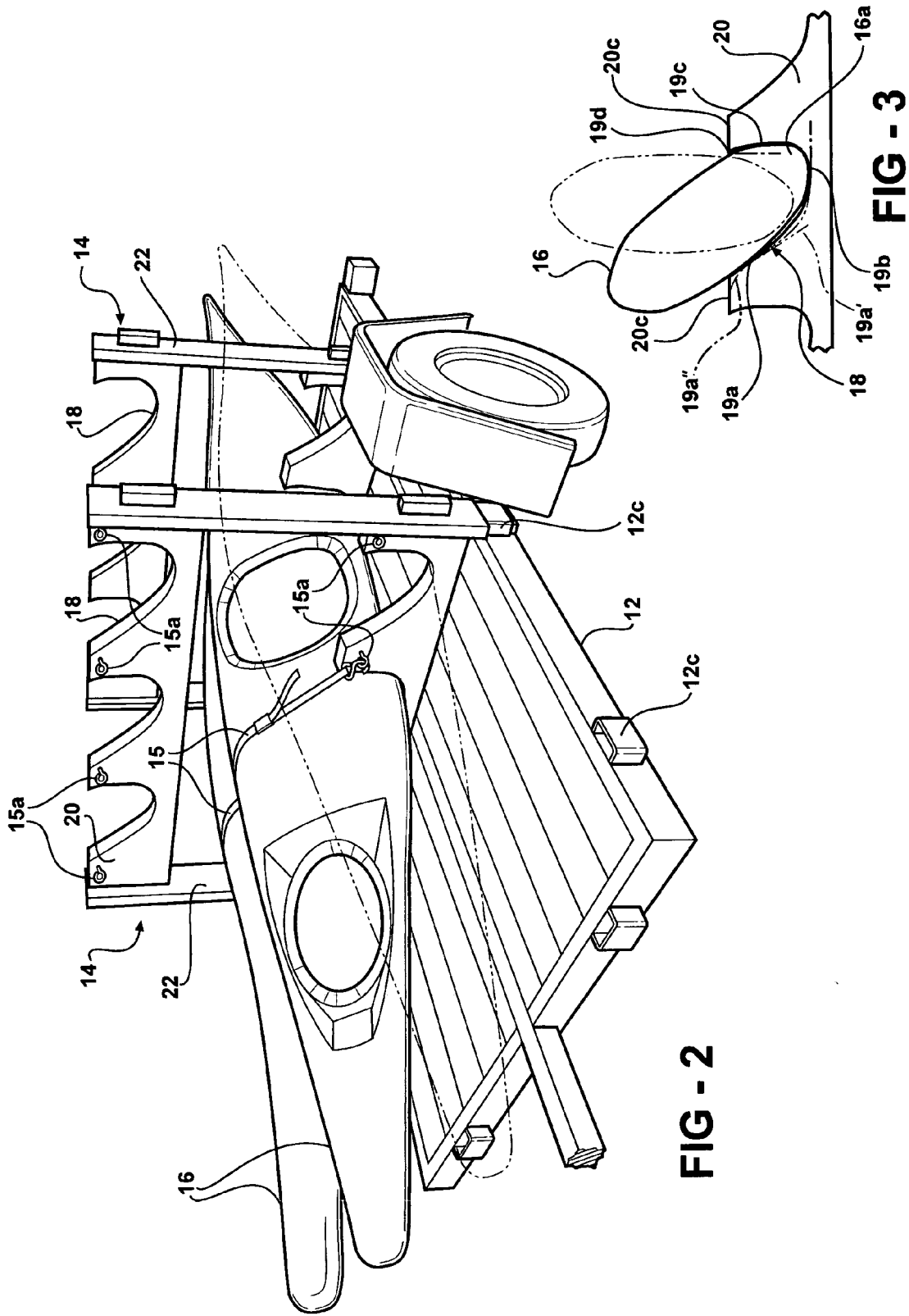

KAYAK CARRIER

BACKGROUND OF THE INVENTION

1. Field of the Invention

The present invention is in the field of trailer type carriers for small boats such as canoes and kayaks.

2. Description of Related Art

People who kayak usually need a convenient way to secure one or more kayaks to a transport vehicle to get the kayaks to water. One well-known way is with a roof-mounted rack, usually temporarily attached to the vehicle roof, capable of carrying one to three kayaks. Kayak roof racks generally seem to be designed to mount kayaks right side up or at a sideways angle.

While canoe roof racks are also known, they typically hold the canoes upside down, probably since canoes' large open hulls are more difficult to cover and therefore more likely to collect water and cause turbulence while driving, but are easily secured when flipped over onto their parallel upper edges. The more slender, flexible nature of kayak hulls with their sloped upper surfaces and upturned bow and stern ends do not naturally lend themselves to an inverted mount.

A problem with vehicle roof racks is the difficulty in loading and unloading relatively heavy kayaks and canoes at rooftop height, especially for smaller people. Canoes tend to be heavier than kayaks, and another popular way to carry canoes is accordingly with a low trailer-mounted rack. As with roof-type canoe racks, the canoes generally seem to be carried upside down. These trailer racks are typically meant to carry multiple canoes, are often used by commercial canoe liveries and the like, and tend to be large, cumbersome metal structures permanently mounted or integrally built into a wheeled trailer structure. One common type of trailered canoe carrier uses T-shaped racks, with the canoes placed upside-down on the crossbars of paired "T" racks and tied or strapped or clamped in place. An example of this type of rack is U.S. Pat. No. 3,610,431 to Rodden, in which the inverted canoes are held in place at their edges and keels by sliding arms and clamping members. Trailer type racks are believed to be more common for canoes than for kayaks, partly due to the differences in hulls described above, although the inventors have known kayakers to use homemade, purpose-built trailers with canoe type crossbar racks on which kayaks ride right side up on padded hull supports, held in place by straps. Kayakers have also been known to fasten rooftop kayak carriers onto canoe type trailer racks in makeshift fashion to carry the kayaks sideways, but this tends to be awkward and less stable.

A disadvantage of using canoe-type rack trailers for kayaks is the need to secure the upright kayak hulls on the crossbar supports with straps, which the Rodden '431 patent describes as a characteristically unstable way to secure even the tiedown-friendly hulls of inverted canoes, subject to shifting and damage. Yet Rodden's clamping-member modified canoe crossbars would not in our opinion be suitable or desirable for carrying the relatively delicate hulls of kayaks.

While roof-type kayak racks are generally out of the way when not in use, whether left on the roof of the car or removed for storage, trailers for canoes and kayaks require a lot of storage space. Since canoe and kayak trailers in our experience are dedicated-use trailers, this means that they tend to sit around unused most of the time, taking up space.

BRIEF SUMMARY OF THE INVENTION

The present invention is a trailer-mounted kayak carrier in which a pair of fore-and-aft spaced racks are adapted to be mounted crosswise on a standard utility trailer to support fore and aft ends of one or more kayaks. The racks have aligned hull supports shaped to support a kayak hull at an acute angle. The hull supports have an essentially continuous hull-engaging surface contour, with an offset trough opening to a longer, shallowly curved keel-engaging entry ramp, and terminated on the other side by a shorter, steeper, more tightly curved edge-engaging locking surface that turns back in toward the trough to overlie a portion of the kayak. The shape is similar to half of a "heart" symbol turned sideways, and results in the kayak hull smoothly camming itself into a position in the hull support in which the hull is rotationally locked in the insertion direction at an acute angle. The continuous, curved nature of the hull support surface cradles a large percentage of the kayak hull for better support and a better grip on the hull.

The kayak racks are preferably removably mounted on the trailer. In a preferred form the kayak racks are adapted with posts on their ends to be inserted in drop-in fashion into the existing siderail supports commonly found on utility trailers with removable siderails. The racks can also be adapted to be removably secured to permanent trailer siderails, if desired.

In a further preferred form the hull supports are formed as cutouts in essentially flat, panel-shaped racks, opening on the upper edges of the racks. The flat racks are easy to store when removed from the utility trailer.

In an alternate embodiment of the invention, the racks are joined by a longitudinal frame structure, the frame being sized to drop into and be secured to the trailer bed, with or without siderails. The drop-in frame assembly further can define a boxlike storage volume, either fixed or capable of receiving a removable storage container. This framed rack embodiment can also be used to store kayaks when the rack is removed from the trailer.

These and other features and advantages of the invention will become apparent upon reading the following detailed description along with the accompanying drawings.

BRIEF DESCRIPTION OF THE DRAWINGS

FIG. 2 is a front perspective view of the trailer of FIG. 1.

FIG. 3 is a front elevation view of one of the kayak rack hull supports, with a kayak shown mounted therein in both its initially inserted orientation (phantom lines) and its rotationally locked position (solid lines).

DETAILED DESCRIPTION OF THE INVENTION

Figure 1:
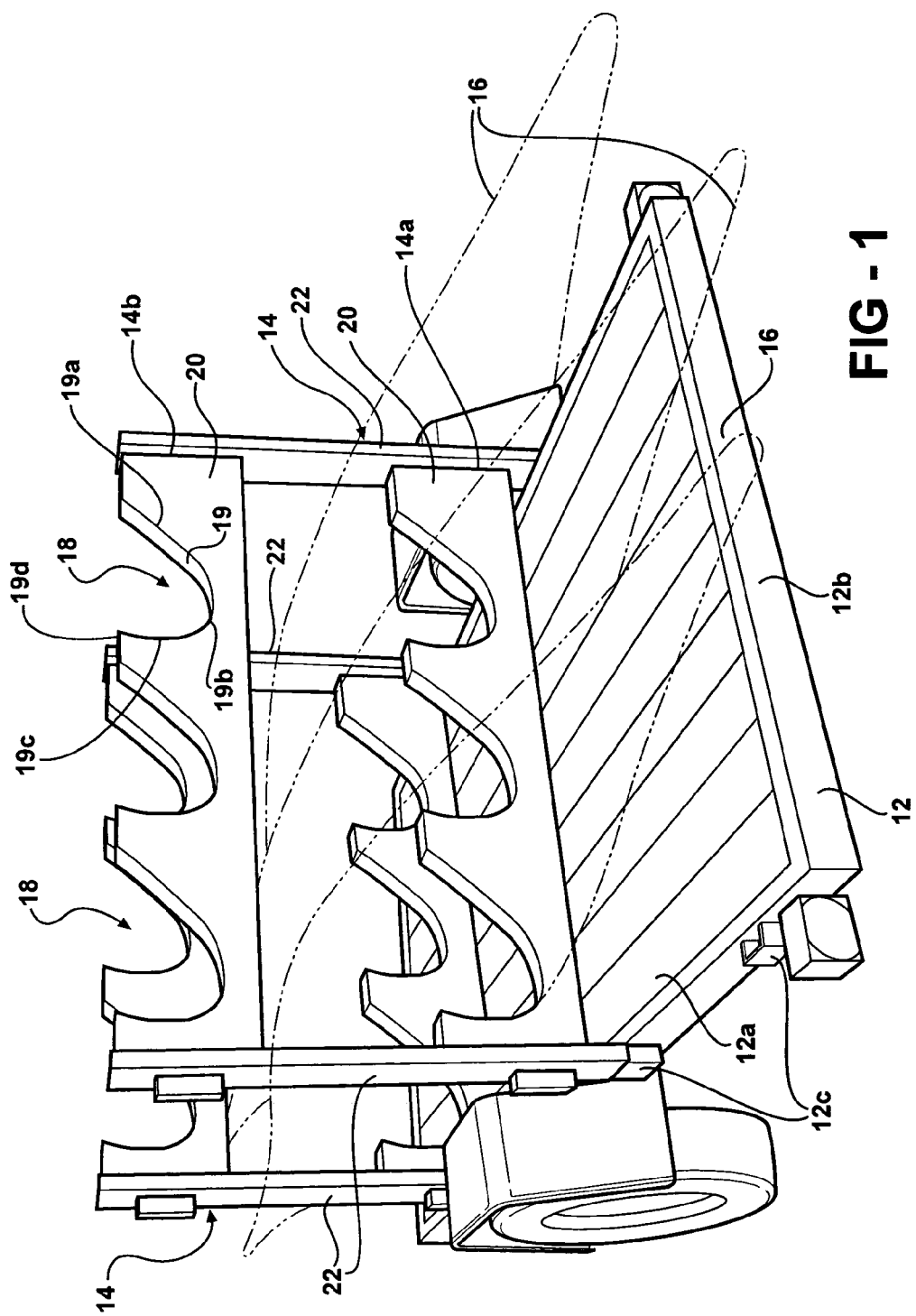
FIG. 1 is a rear perspective view of a preferred embodiment of a trailer mounted kayak rack system according to the invention, with several kayaks shown mounted on the racks in phantom.

Referring first to FIG. 1, a common type of utility trailer 12 is shown modified with a removable set of kayak racks 14 according to the invention. Trailer 12 has a cargo bed 12a, a frame 12b, and is attached at its forward end to a vehicle 10 in known manner. Sockets 12c formed along the sides of frame 12b normally support removable siderails of known type (not shown), the siderails having been removed and replaced in FIG. 1 with kayak racks 14 supported in sockets 12c. A lower level 14a of racks 14 is shown supporting three kayaks 16 (illustrated in phantom lines) in three hull supports 18, while an upper level 14b of racks 14 is shown with hull supports 18 empty.

Each kayak rack 14 includes one or more horizontal support members 20, in the illustrated embodiment panels made from wood or preferably plastic; upright supports 22, in the illustrated embodiment also made from wood or preferably plastic, for securing the horizontal support members 20 on or above the cargo bed of trailer 12; and one or more hull supports 18 formed in each horizontal support member 20. In the illustrated embodiment each hull support 18 is formed as a cutout portion of the solid panel members 20.

As best shown in FIGS. 1 and 3, hull supports 18 have a continuous hull-supporting surface 19 with a preferred contour that can be described as a half-a-heart shape, as if a stylized heart symbol were cut vertically down the middle and turned sideways. In the illustrated embodiment surface 19 has a shallow, acutely angled or curved entry ramp portion 19a descending over a relatively long distance into an off-center trough 19b, and then reversely curving more sharply up and back toward the trough at 19c to terminate at a point 19d overlying at least some of the inserted kayak hull and preferably overlying a portion of trough 19b. The resulting surface contour of the continuous cutouts 18 allows most kayak hull styles to be inserted approximately sideways or edge-first into the cutout and then smoothly rotated down into a position in which the kayak hull is rotationally locked in the direction of its sideways insertion into the hull support. The hull shape of kayak 16 illustrated schematically in FIG. 3 is intended to be a generic shape representing most common styles such as hard chine, fish form, and Swede form.

It will be understood that although the hull-supporting surface contour 19 is conveniently described as half-a-heart, the contour may vary somewhat. For example, entry ramp portion 19a can be a shallow concave curve as shown, or may be essentially flat (19a'), or may start with a shallow convex curvature changing to a concave curvature as it approaches the trough (19a''), or may be a steeper concave curve on its way down into the trough. The surface contour might be alternately described as having a fishhook shape, or a shepherd's staff, or a j-shape, set at an acute angle with a portion of the short part of the curve or hook turning back toward the trough to overlie a top portion of the kayak hull held at an acute angle in the horizontal support.

In general, while the surface contour 19 of hull supports 18 is shown as a continuous cutout in a panel-shaped horizontal support member 20, it will be understood that the surface contour need only be sufficiently continuous to present a smooth sliding surface for the rotational movement of the kayak hull into the hull support. For example, a succession of rollers defining a correspondingly shaped path would be sufficient, even though there might be a small gap between each roller to allow free rolling. For the same reason, while the hull supports are described as having curved surfaces, small flats or interruptions that do not detract from the overall curvature, or that average out to an overall curved shape and still provide a smooth rotational movement of the kayak hull into its locked position are possible.

While the illustrated racks 14 are shown made from wood or plastic in a preferred panel construction, it will be further understood that alternate materials and constructions could be used. For example, horizontal support members 20 could be made from plastic or metal tubing, with hull supports 18 formed by molding or bending the tubing into the surface contour 19.

Illustrated horizontal support panels 20 are shown with flat upper edges 20c between hull support cutouts 18. If spaced properly, flat edges 20c allow racks 14 to be optionally used to support inverted canoes, the sidewall edges of the canoes resting on flats 20c.

While hull support cutouts 18 are preferably open-topped as illustrated, it is possible to form closed hull supports in horizontal supports 20. This could be achieved by cutting or forming hull supports 18 in horizontal supports 20 below the upper edges of panels 20. Kayaks would have to be first inserted longitudinally into both the fore and aft closed-top hull supports, rather than edgewise as shown in FIG. 3, before being rotated into their locked positions.

Figure 1A:
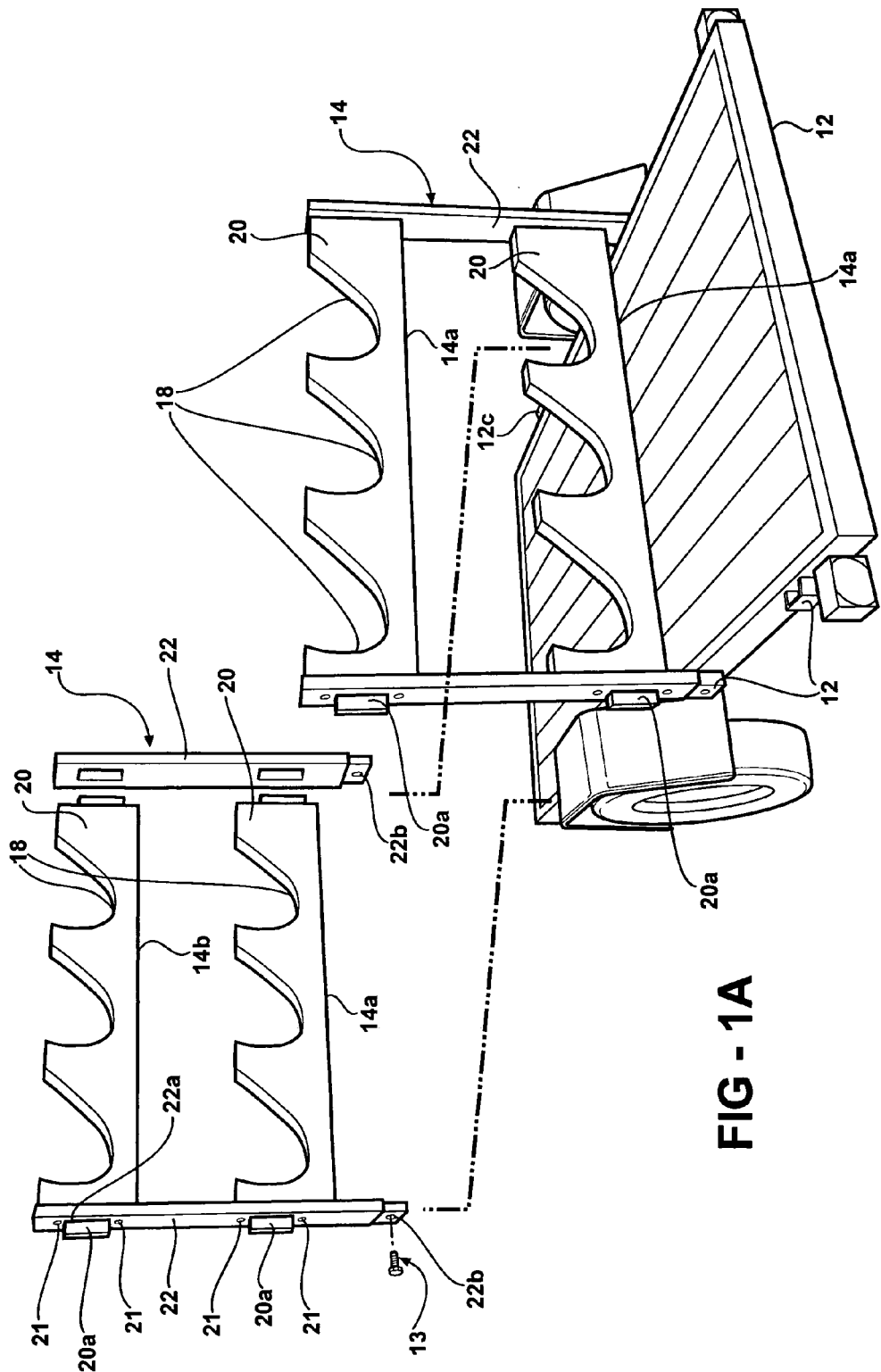
FIG. 1A is an exploded view of the forward and aft kayak racks of FIG. 1 replacing trailer siderails in their mounting points on the trailer.

FIG. 1A shows the manner in which the illustrated racks 14 are assembled and inserted into trailer 12 in place of siderails (not shown, but well known). Horizontal panels 20 are formed with tenons 20a in their ends, the tenons mating with mortise openings 20b in rack uprights 22. While a friction fit may be sufficient in some circumstances, it is preferred to further secure panels 20 to uprights 22 with mechanical fasteners such as bolts 21 located above and below the tenon-and-mortise connection. Each rack may be further stabilized against sway with a tension rod (not shown) connected between uprights 22. The lower ends 22b of uprights 22 are inserted into trailer siderail supports 12c after the siderails are removed, either before or after the panels 20 are connected to uprights 22. Uprights 22 preferably have a snug fit in siderail supports 12c, and are preferably further secured in place, for example using removable bolts 13 often used to secure siderails in sockets 12c.

Figure 5:
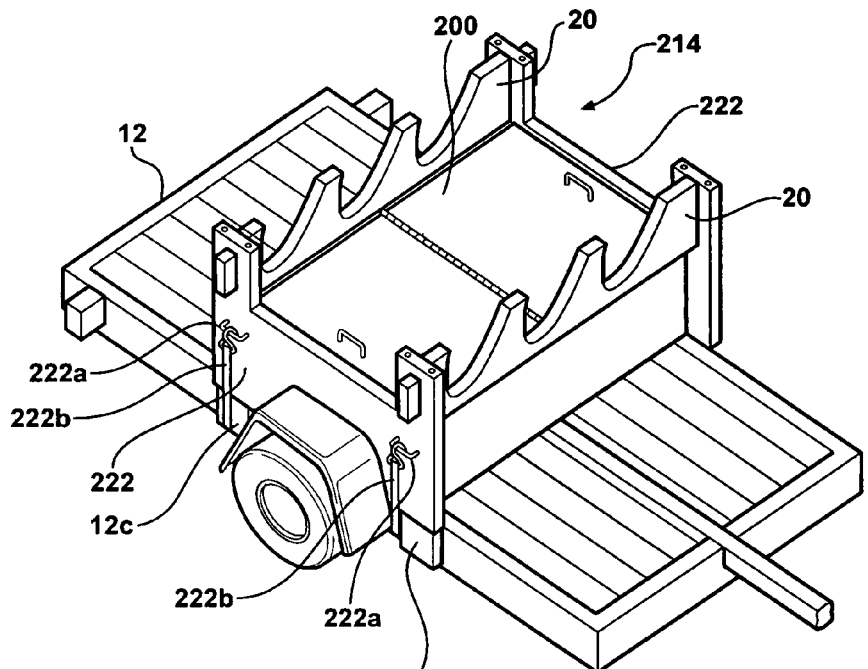
FIG. 5 shows an alternate embodiment of a kayak rack according to the invention, in which the forward and rear racks are joined into a drop-in assembly with a boxlike frame.
Figure 5A:
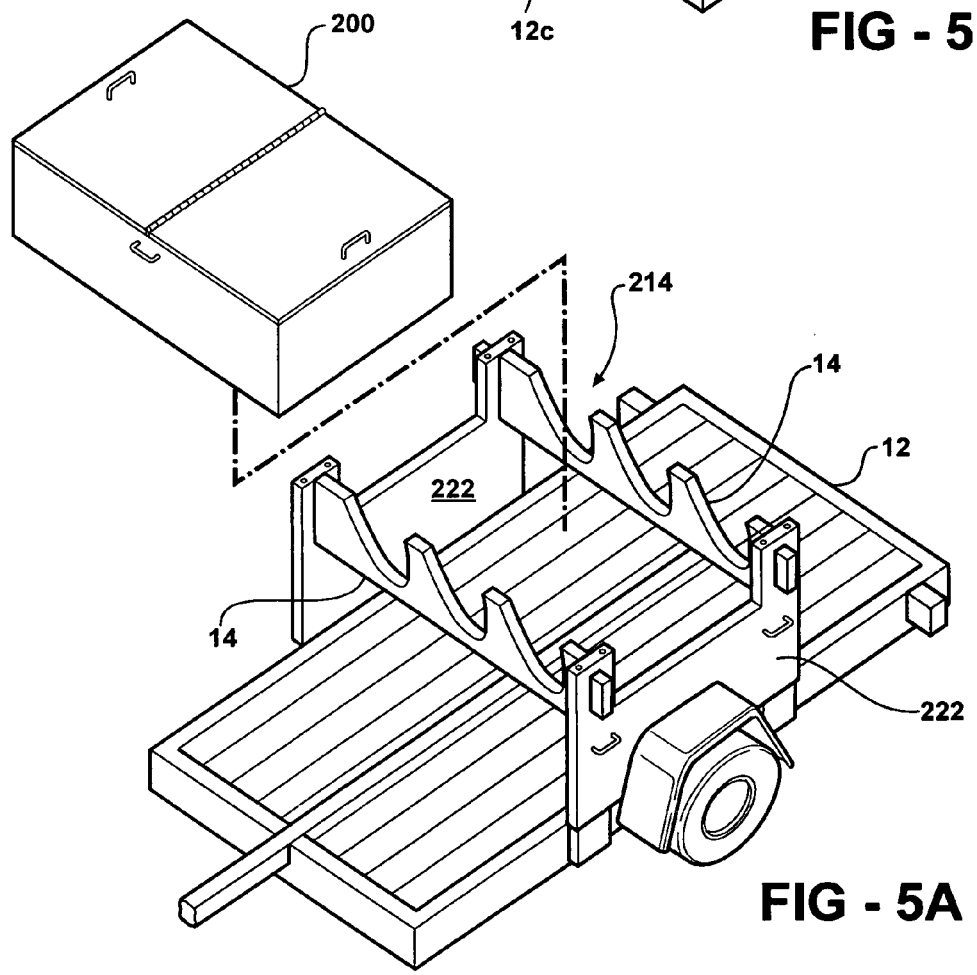
FIGS. 5A–5C show three alternate versions of the rack of FIG. 5, in which storage boxes are removably mounted between the forward and rear racks.

It will be understood that while the drop-in socket type siderail supports 12c are common, and that the illustrated embodiment is a most preferred embodiment adapted for such sockets, other types of removable connection can be used to removably secure racks 14 to a trailer. FIGS. 5 and 5A, for example, show a tie-down version of the invention in which forward and rear racks 14 are joined by longitudinal frame members 222 to form a self-supporting box-like rack assembly 214. Tie-down anchors such as 222a are located on the sides of frame members 222, and suitable tie-down means such as cables, chains, or straps 222b are connected to anchors 222a and to suitable points on the trailer bed or frame. If the spacing of frame members 222 is less than the spacing of existing side-rails on the trailer, rack assembly 214 could also be secured to the trailer between the side-rails, and could even be secured to the side-rails themselves. Longitudinal frame members 222 could also be provided with lower posts or tenons to mate with trailer side-rail sockets 12c as shown.

FIG. 3 illustrates the manner in which a kayak is loaded onto racks 14, and more particularly into hull supports 18. A kayak 16 is initially oriented approximately sideways (phantom lines), and a first side edge 16a on a forward part of the kayak is guided into the entry ramp portion 19a of a hull opening on the rear rack. The continuous surface 19 of hull support 18 allows the leading edge of the kayak hull to first slide longitudinally forward into the matching hull support on forward rack 14, and then to smoothly slide down into trough portions 19b. The curvature of surface 19 into and beyond trough 19b causes the kayak hull to rotate, such that kayak edge 16a is guided into engagement with the inverted radius of hull support portion 19c (solid lines). This locks the kayak rotationally in the racks, and to some extent longitudinally as well. To best secure the kayaks longitudinally in the racks, however, it is preferred to further use conventional straps such as adjustable straps 15 shown in FIG. 2, a strap being associated with each hull support and connectable to anchor points such as eyebolts 15a. It is also possible to anchor straps to points on the trailer and lace the straps through or over the kayaks in racks 14.

In a preferred form, the forward rack's hull supports 18 are provided with an anti-slip material at least on portion 19c of the hull support contour. Examples of suitable material include but are not limited to rubberized tape materials, grit-surfaced materials, and friction-enhancing materials such as carpet, synthetic turf, and the like. The anti-slip material may be given directional properties, for example allowing the kayak hull to rotate smoothly into its rotationally locked position in hull support 18 but frictionally resisting longitudinal motion in hull support 18, or vice versa. The anti-slip material should be selected to grip the kayak hull without scratching it.

Figure 4A:
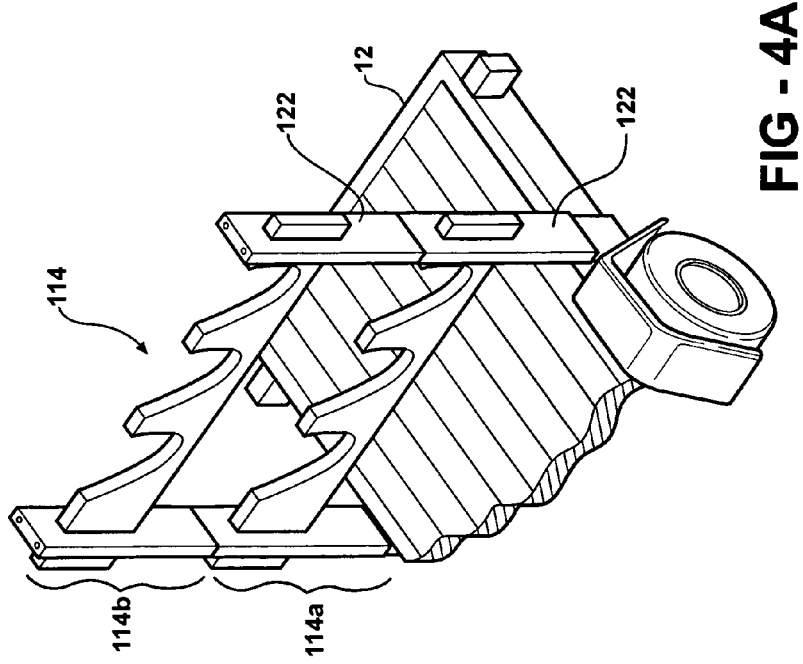
FIG. 4A is similar to FIG. 4, but shows the racks assembled and stacked.
Figure 4:
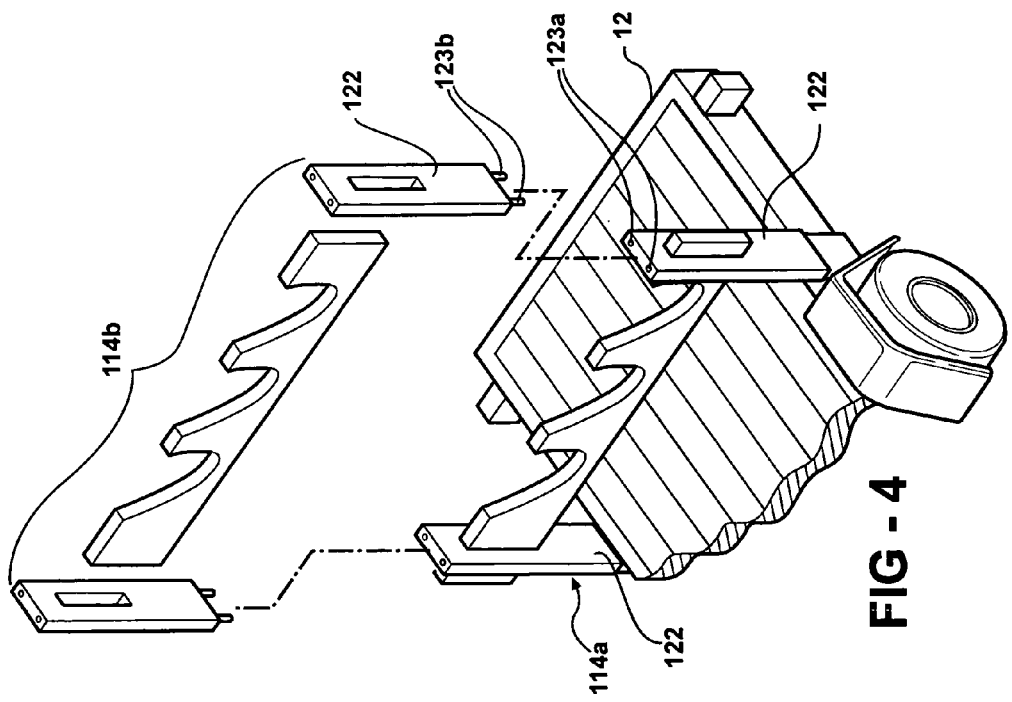
FIG. 4 is a perspective view of a modular rack embodiment in which an upper rack is stackable on a lower rack, and further shows the upper rack exploded into its constituent parts prior to assembly.

FIGS. 4 and 4A illustrate an optional modular rack embodiment 114 in which upper racks 114b can be removably stacked on lower racks 114a, depending on the number of kayaks to be transported. In the illustrated example, upper racks 114b are provided with pegs or posts 123b protruding from the lower ends of upright members 122, pegs 123b designed to mate with corresponding holes or sockets 123a in the upper ends of the uprights 122 on lower racks 114a. It will be understood that other mechanical connections between the upper and lower racks could be used, including but not limited to spline members, splints, clamps, interlocking joints and sleeves, and the like.

Figure 5B:
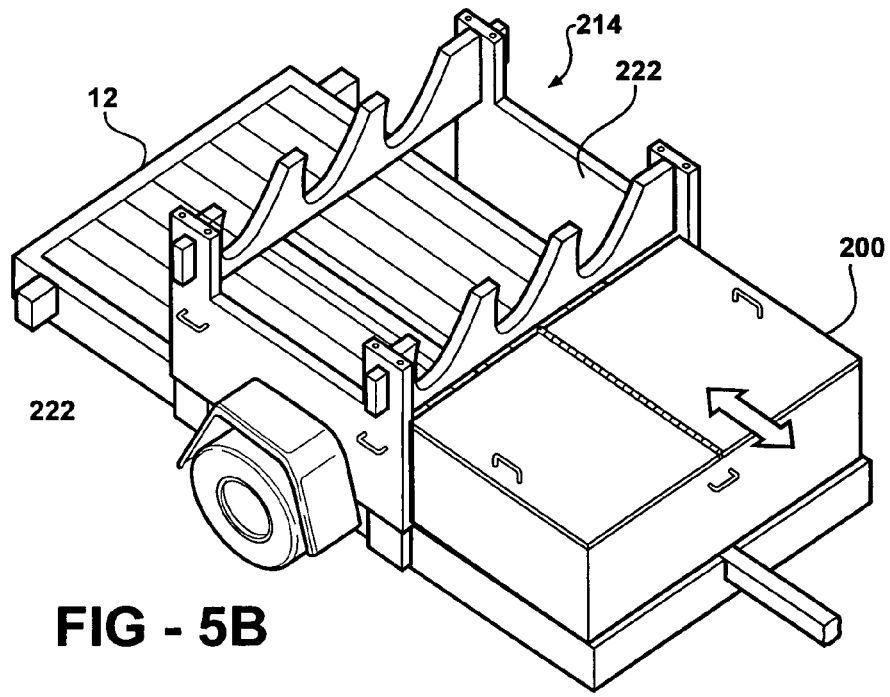
Figure 5C:
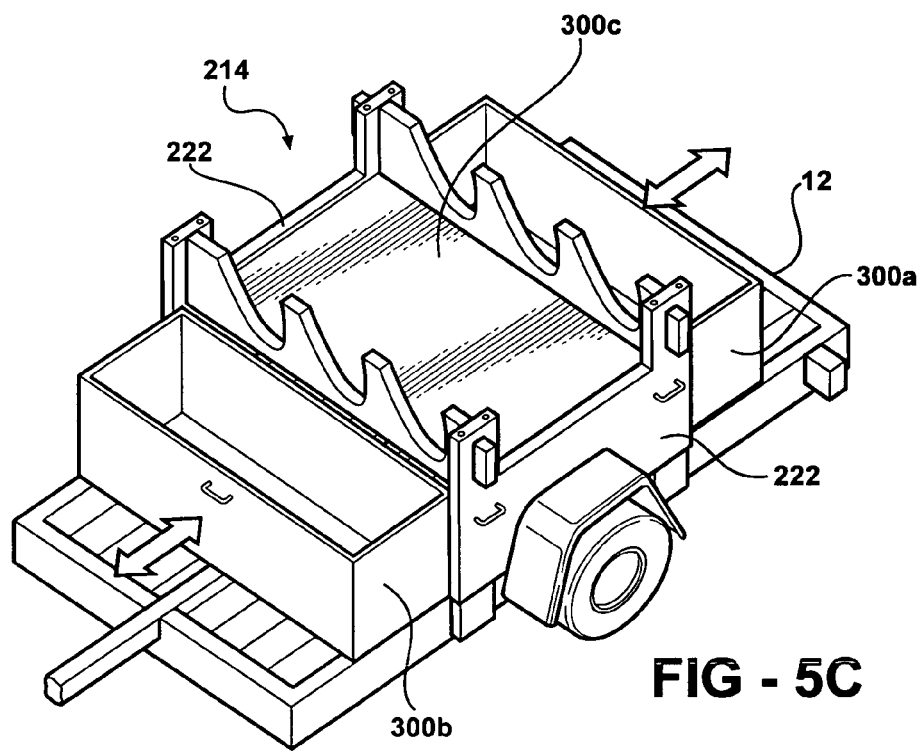

Referring again to FIGS. 5 and 5A, the drop-in rack assembly 214 is shown with the additional option of one or more fixed or removable storage bins or boxes 200 fitted below horizontal rack panels 20 between longitudinal frame members 222. Storage box 200 can be open or covered, made for example from the same wood or plastic material as racks 14. If removably mounted in rack assembly 214, box 200 can be sized to be dropped into and lifted out of assembly 214 (FIG. 5A), or to slide longitudinally underneath from either the forward or rear end of trailer 12 (FIG. 5B). FIG. 5C shows another possible box arrangement in which separate box compartments 300a and 300b are individually slidable out of rack 214 in fore and aft directions. Box compartments 300a and 300b can be open-topped or covered with a cover 300c built into rack assembly 214.

It will accordingly be understood that the disclosed embodiments are representative of presently preferred forms of the invention, but are intended to be illustrative rather than definitive of the invention. The scope of the invention is defined by the following claims.

We claim:

1. A kayak carrier comprising:
a rigid horizontal rack member adapted to be mounted crosswise on an automotive transport platform, the horizontal rack member comprising a hull support comprising a rigid, essentially continuous curved hull-engaging surface with a longer, shallower entry portion, an off-center trough, and a shorter, more steeply curved hull-locking portion that reverses direction back in toward the trough to overlie a top portion of a kayak hull held at an acute angle in the hull support, such that a kayak hull inserted into the hull support in a generally edgewise orientation is capable of being smoothly rotated on the hull-engaging surface down into the trough portion and rotationally locked at an acute angle against the hull-locking portion.

2. The kayak carrier of claim 1, wherein the hull support's essentially continuous curved surface has a half-a-heart shape.

3. The kayak carrier of claim 1, comprising a pair of the horizontal rack members adapted to be mounted in longitudinally spaced fashion on the automotive carrying platform.

4. The kayak carrier of claim 3, wherein the horizontal rack members are adapted to be mounted on a trailer.

5. The kayak carrier of claim 3, wherein the horizontal rack members are supported on vertical supports adapted to fit into side-rail supports on the trailer.

6. The kayak carrier of claim 3, wherein the horizontal rack members are connected in spaced fashion with longitudinal frame members into a rack assembly adapted to be secured to the trailer as a unit.

7. The kayak carrier of claim 5, wherein the rack assembly defines a storage area between the horizontal rack members below the hull supports.

8. The kayak carrier of claim 6, wherein the storage area includes a removable storage container.

9. The kayak carrier of claim 1, wherein the horizontal rack member comprises a plurality of horizontally spaced hull supports.

10. The kayak carrier of claim 1, wherein the hull support opens onto an upper surface of the horizontal rack member.

11. The kayak carrier of claim 1, wherein the horizontal rack member is a substantially flat panel member, and the hull support is a cutout portion of the panel member.

12. The kayak carrier of claim 11, wherein the hull support opens onto an upper edge of the panel member.

13. The kayak carrier of claim 1, wherein the hull-locking portion of the hull support terminates at a point overlying at least a portion of the trough.

* * * * *